United States Patent
Tanaka

(10) Patent No.: US 12,520,044 B2
(45) Date of Patent: Jan. 6, 2026

(54) INFORMATION PROCESSING APPARATUS THAT CHANGES A DISPLAY STATE OF AN ICON ON A CAPTURED IMAGE DEPENDING ON WHETHER ZOOM CONTROL IN TRACKING IS PERMITED, AND CONTROL METHOD THEREOF

(71) Applicant: Canon Kabushiki Kaisha, Tokyo (JP)

(72) Inventor: Ryo Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 18/501,087

(22) Filed: Nov. 3, 2023

(65) Prior Publication Data
US 2024/0163559 A1    May 16, 2024

(30) Foreign Application Priority Data

Nov. 15, 2022 (JP) .................... 2022-182800
Sep. 7, 2023 (JP) .................... 2023-145579

(51) Int. Cl.
| | |
|---|---|
| H04N 23/69 | (2023.01) |
| G06T 7/20 | (2017.01) |
| H04N 23/61 | (2023.01) |
| H04N 23/63 | (2023.01) |
| H04N 23/695 | (2023.01) |

(52) U.S. Cl.
CPC .............. H04N 23/69 (2023.01); G06T 7/20 (2013.01); H04N 23/61 (2023.01); H04N 23/632 (2023.01); H04N 23/695 (2023.01)

(58) Field of Classification Search
CPC ...... H04N 23/69; H04N 23/61; H04N 23/632; H04N 23/695; H04N 23/635; H04N 23/62; G06T 7/20

USPC ........................................ 348/240.3
See application file for complete search history.

(56) References Cited

U.S. PATENT DOCUMENTS

| | | | | |
|---|---|---|---|---|
| 6,650,368 B1 * | 11/2003 | Doron | ................. | H04N 1/3935 348/E5.042 |
| 7,213,214 B2 * | 5/2007 | Baar | ................... | G06F 3/0481 345/660 |
| 11,297,244 B2 * | 4/2022 | Choe | ................... | H04N 23/631 |
| 11,962,889 B2 * | 4/2024 | Manzari | ............... | H04N 23/675 |
| 2007/0279492 A1 * | 12/2007 | Ohnishi | ................ | H04N 23/61 348/169 |
| 2008/0192020 A1 * | 8/2008 | Kang | ..................... | G06F 3/017 345/173 |

(Continued)

FOREIGN PATENT DOCUMENTS

JP        2014039166 A    2/2014

*Primary Examiner* — Usman A Khan
(74) *Attorney, Agent, or Firm* — Venable LLP

(57) ABSTRACT

An information processing apparatus for doing a setting of a capturing apparatus having a tracking function for tracking an object by pan/tilt/zoom (PTZ) control, comprises: an acquisition unit configured to acquire a captured image obtained by the capturing apparatus; and a display control unit configured to display, on a display unit, a graphical user interface (GUI) configured to accept a setting of a target position in the captured image of an object that is a tracking target. The display control unit changes an icon indicating the target position in the GUI between a case where the target position in a first mode that permits zoom control in tracking is set and a case where the target position in a second mode that suppresses the zoom control in tracking is set.

9 Claims, 8 Drawing Sheets

(56) References Cited

U.S. PATENT DOCUMENTS

| | | | |
|---|---|---|---|
| 2008/0218582 A1* | 9/2008 | Buckler | H04N 7/15 348/E7.083 |
| 2010/0026721 A1* | 2/2010 | Park | G09G 5/14 345/660 |
| 2010/0157105 A1* | 6/2010 | Yokohata | G02B 7/38 348/E5.055 |
| 2020/0374464 A1* | 11/2020 | Kosaka | H04N 23/631 |

* cited by examiner

INFORMATION PROCESSING APPARATUS THAT CHANGES A DISPLAY STATE OF AN ICON ON A CAPTURED IMAGE DEPENDING ON WHETHER ZOOM CONTROL IN TRACKING IS PERMITED, AND CONTROL METHOD THEREOF

BACKGROUND

Field

The present disclosure relates to setting of an automatic tracking function in a monitoring camera.

Description of the Related Art

There have been proliferated cameras having an automatic tracking function for performing pan/tilt/zoom (PTZ) control such that an object obtains a preset size and position in a capturing screen. Japanese Patent Laid-Open No. 2014-39166 discloses a technique for displaying, on a setting screen, an icon indicating a target size and target position of an object when performing automatic tracking. By using such a setting screen, a user can intuitively do settings of automatic tracking.

Depending on a capturing scene, an object rarely moves in the back-and-forth (depth) direction with respect to the camera in some cases. For example, when capturing a lecturer from the back side of a lecture room, the lecturer that is the object mainly moves only in the left-and-right direction with respect to the camera. If zoom control is performed in that case, a video hard to see may be obtained because of a change of the angle of view. Hence, it is preferable to set zoom control in automatic tracking OFF.

However, when performing automatic tracking, even if the zoom control is OFF, an icon indicating a target position for pan/tilt control is displayed. Hence, the user can easily grasp, based on the presence/absence of the icon on the setting screen, whether automatic tracking is ON or OFF, but it is difficult to intuitively grasp whether zoom control is ON or OFF in automatic tracking.

SUMMARY

According to one aspect of the present disclosure, an information processing apparatus for doing a setting of a capturing apparatus having a tracking function for tracking an object by pan/tilt/zoom (PTZ) control, comprises: an acquisition unit configured to acquire a captured image obtained by the capturing apparatus; and a display control unit configured to display, on a display unit, a graphical user interface (GUI) configured to accept a setting of a target position in the captured image of an object that is a tracking target, wherein the display control unit changes an icon indicating the target position in the GUI between a case where the target position in a first mode that permits zoom control in tracking is set and a case where the target position in a second mode that suppresses the zoom control in tracking is set.

The present disclosure provides a tracking setting graphical user interface (GUI) that allows a user to do intuitive grasp.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
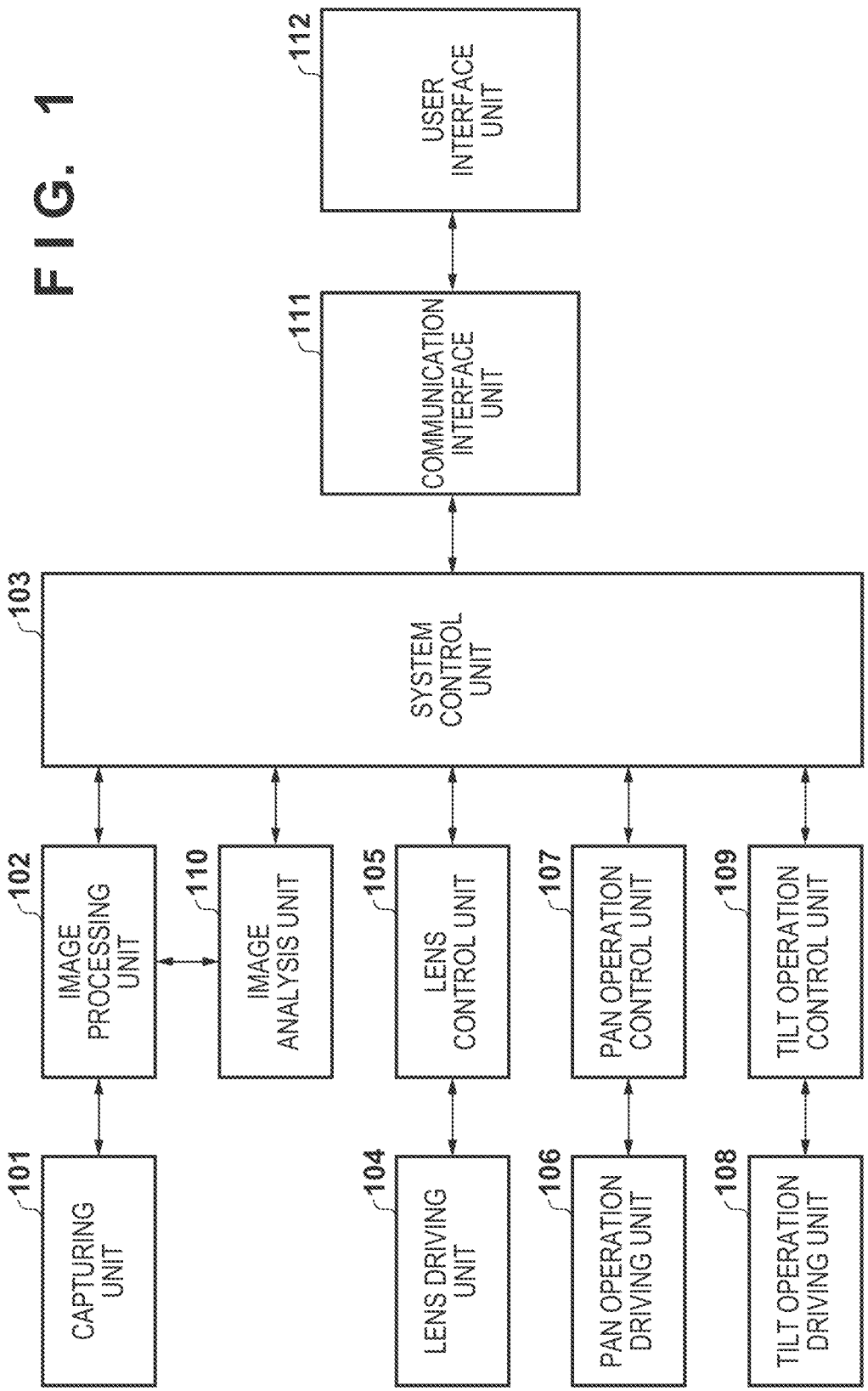
FIG. 1 is a view showing the functional blocks of a capturing system according to the first embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

As the first embodiment of an information processing apparatus according to the present disclosure, an information processing apparatus that sets a tracking function in a capturing apparatus configured to be able to perform pan/tilt/zoom (PTZ) control will be described below as an example.

<System Configuration>

FIG. 1 is a view showing the functional blocks of a capturing system including the information processing apparatus according to the first embodiment. Note that the configuration shown in FIG. 1 merely exemplarily shows constituent elements for implementing the operation of the information processing apparatus to be described below. For example, other constituent elements such as constituent elements associated with a power supply system and constituent elements associated with recording/distribution of captured videos are not illustrated. Note that in the following explanation, a capturing unit 101 to a communication interface unit 111 are assumed to be constituent elements in the capturing apparatus. A user interface unit 112 is assumed to be a constituent element of an external apparatus that exists outside the capturing apparatus.

The capturing unit 101 converts an optical image of an outer world generated by a capturing optical system into a video signal by photoelectric conversion and outputs it. The video signal is output to an image processing unit 102 at the subsequent stage. As a capturing element configured to perform photoelectric conversion, for example, a CMOS image sensor can be used. Alternatively, a CCD image sensor may be used as the capturing element.

The image processing unit 102 performs various kinds of known image processing for the video signal output from the capturing unit 101, thereby generating captured video data.

For example, the image processing unit 102 digitizes the video signal, thereby converting it into captured video data reproducible by another apparatus. To generate (convert) captured video data from the video signal, the image processing unit 102 can use various known formats such as MPEG-2.

An image analysis unit 110 performs processing for detecting a specific object as a tracking target from the captured video data generated by the image processing unit 102. For example, as the specific object, a human head portion is detected. To detect the specific object, a known technique such as deep learning can be used. The image analysis unit 110 may detect a specific person registered as a tracking target by matching from feature data of an image of a face portion.

A lens driving unit 104 is formed by the driving system of a capturing optical system (including a focus lens and a zoom lens), and a motor or the like serving as a driving source. Operation control of the lens driving unit 104 is done by a lens control unit 105. The lens control unit 105 performs operation control of the lens driving unit 104 in accordance with an instruction from a system control unit 103.

A pan operation driving unit 106 is formed by a mechanical driving system for performing the pan operation of the capturing apparatus, and a motor or the like serving as a driving source. For example, the capturing apparatus can rotate the capturing direction (the optical axis direction of the capturing optical system) by 360° in the pan direction. Operation control of the pan operation driving unit 106 is done by a pan operation control unit 107. The pan operation control unit 107 performs operation control of the pan operation driving unit 106 in accordance with an instruction from the system control unit 103.

A tilt operation driving unit 108 is formed by a mechanical driving system for performing the tilt operation of the capturing apparatus, and a motor or the like serving as a driving source. For example, the capturing apparatus can rotate the capturing direction by 180° in the tilt direction. Operation control of the tilt operation driving unit 108 is done by a tilt operation control unit 109. The tilt operation control unit 109 performs operation control of the tilt operation driving unit 108 in accordance with an instruction from the system control unit 103.

The system control unit 103 includes a processor (for example, a CPU or a DSP) and a memory (for example, a RAM), and the processor executes processing using a computer program and data stored in the memory, thereby performing operation control of each unit of the capturing apparatus. Note that in the following explanation, the system control unit 103 is assumed to have a function of a web server. Thus, an external apparatus can execute a web application by accessing the system control unit 103. Also, as a result, the system control unit 103 executes or controls each process to be described later as processing to be performed by the capturing apparatus.

For example, the system control unit 103 outputs an instruction of image quality adjustment to the image processing unit 102, or outputs an instruction of zoom or focus control to the lens control unit 105. In addition, the system control unit 103 outputs instructions of the pan operation and the tilt operation to the pan operation control unit 107 and the tilt operation control unit 109, respectively.

The communication interface unit 111 performs data communication with an external apparatus existing outside the capturing apparatus. For example, the communication interface unit 111 transmits a captured video generated by the image processing unit 102 to the external apparatus, or receives data transmitted from the external apparatus. The data is, for example, setting data of tracking setting transmitted from the user interface unit 112 to be described later.

The user interface unit 112 is a constituent element in the external apparatus, and provides an interface configured to accept settings for the capturing apparatus from the user. For example, the user interface unit 112 controls displaying, on a display unit, a graphical user interface (GUI) to be described later with reference to FIGS. 2 to 5, accepts a setting from the user, generates setting data of tracking setting, and transmits it to the communication interface unit 111.

Note that in the above description, the system control unit 103 exists in the capturing apparatus, and the user interface unit 112 exists in the external apparatus. However, another configuration is also possible. That is, the system control unit 103 and the user interface unit 112 may be arranged in the external apparatus, or the user interface unit 112 may be arranged in the capturing apparatus. At any rate, the system control unit 103 and the user interface unit 112 cooperatively operate, thereby operating to reflect settings from the user on the capturing apparatus.

In addition, in the above description, the pan/tilt operation is implemented by changing the physical direction of the capturing apparatus. However, the pan/tilt operation may be implemented by another method. For example, the pan/tilt operation may be implemented by changing a region to crop a video obtained by the capturing element (so-called digital pan/tilt). Also, the pan/tilt operation may be implemented by shifting the capturing element on the focal plane of the optical system.

Furthermore, in the above description, the zoom operation is implemented by changing the optical system of the capturing apparatus. However, the zoom operation may be implemented by another method. For example, the zoom operation may be implemented by changing the size of a region to crop a video obtained by the capturing element (so-called digital zoom).

<Setting Screen of Tracking Function>

Here, the capturing apparatus is assumed to have the following two modes as the operation modes of the automatic tracking function.

First mode: an operation mode that permits zoom control at the time of tracking. Even if a tracking target object moves in the back-and-forth (depth) direction with respect to the camera, the size of the object in the captured image can be held at a substantially predetermined size.

Second mode: an operation mode that suppresses zoom control at the time of tracking. In a case where the tracking target object rarely moves in the back-and-forth direction with respect to the camera, a video in which a change in the angle of view caused by the zoom operation is suppressed can be acquired.

A graphical user interface (GUI) for setting the tracking function in the above-described two modes will be described below. The GUI is displayed on the screen of the user interface unit 112 that is the external apparatus.

Figure 2:
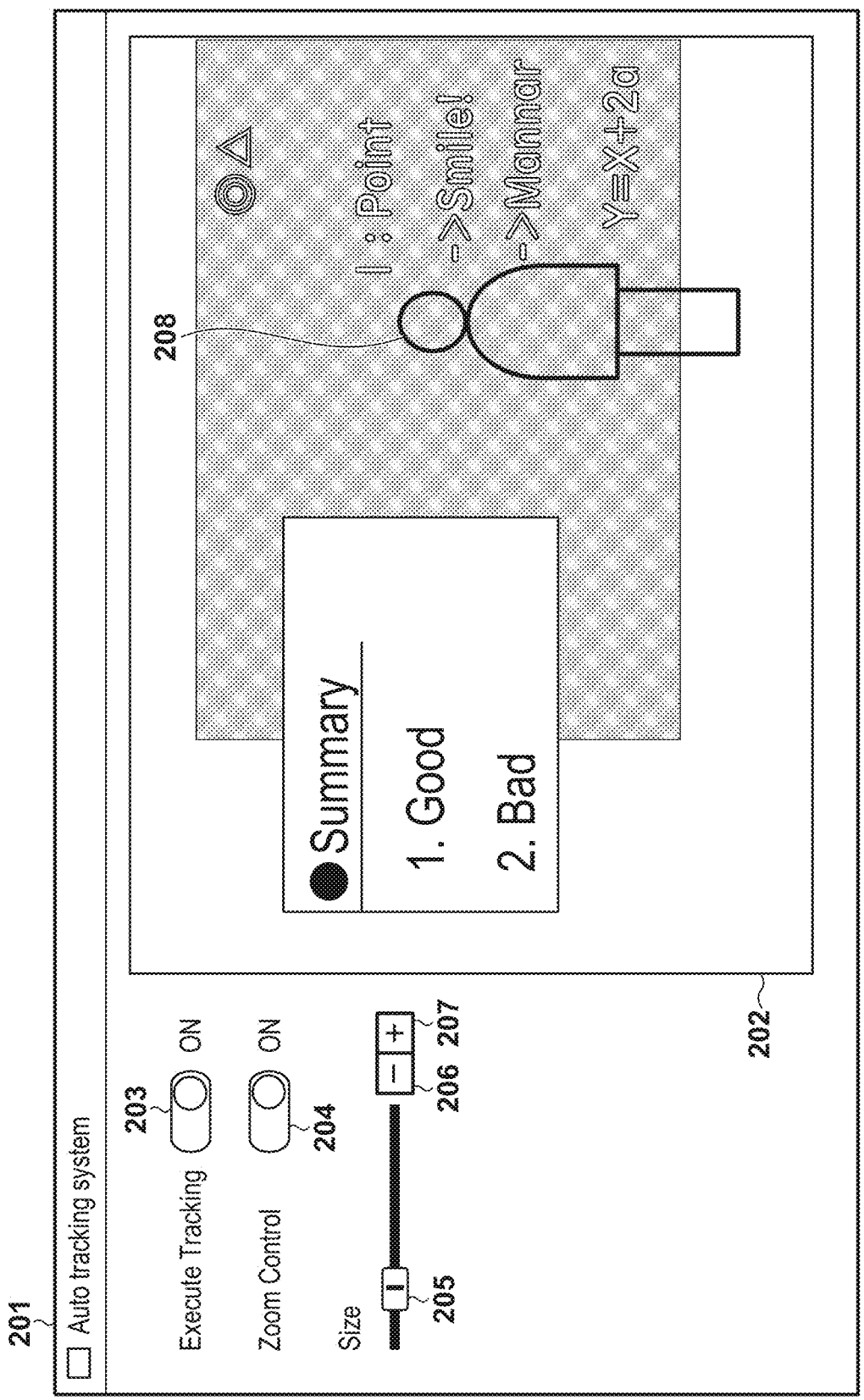
FIG. 2 is a view for explaining the configuration of a setting screen (when performing zoom control)

FIG. 2 is a view for explaining the configuration of a GUI that sets the first mode tracking function. In the first mode, the size and position of the tracking target need to be set.

A setting screen 201 is a screen of a web application that accepts a tracking setting from the user. A video display region 202 is a region where a captured video obtained by the capturing apparatus is displayed. A toggle button 203 is a button configured to set ON/OFF of the tracking function. A toggle button 204 is a button configured to designate whether to perform zoom control during tracking. Here, to set the first mode tracking function, both the toggle button 203 and the toggle button 204 are set in an "ON" state. That is, if both buttons are set "ON", it is decided to accept the setting of the first mode tracking function.

A slider bar 205 is a slider bar configured to accept a setting of the size of the tracking target by a drag operation by the user. The user can also set the size of the tracking target by a click operation on a button 206 and a button 207 in place of the drag operation of the slider bar 205. If the button 206 is clicked, the size can be changed small, and if the button 207 is clicked, the size can be changed large. If the toggle button 204 is set "ON", the slider bar 205, the button 206, and the button 207 are enabled and become operable by the user.

An icon 208 is an icon that displays the target size and position of the tracking target. The size of the icon changes synchronized with the size set by the slider bar 205 (or the button 206 and the button 207). Also, the user can change the setting of the position of the tracking target in the captured video by dragging and dropping the icon 208 in the video display region 202.

Figure 3:
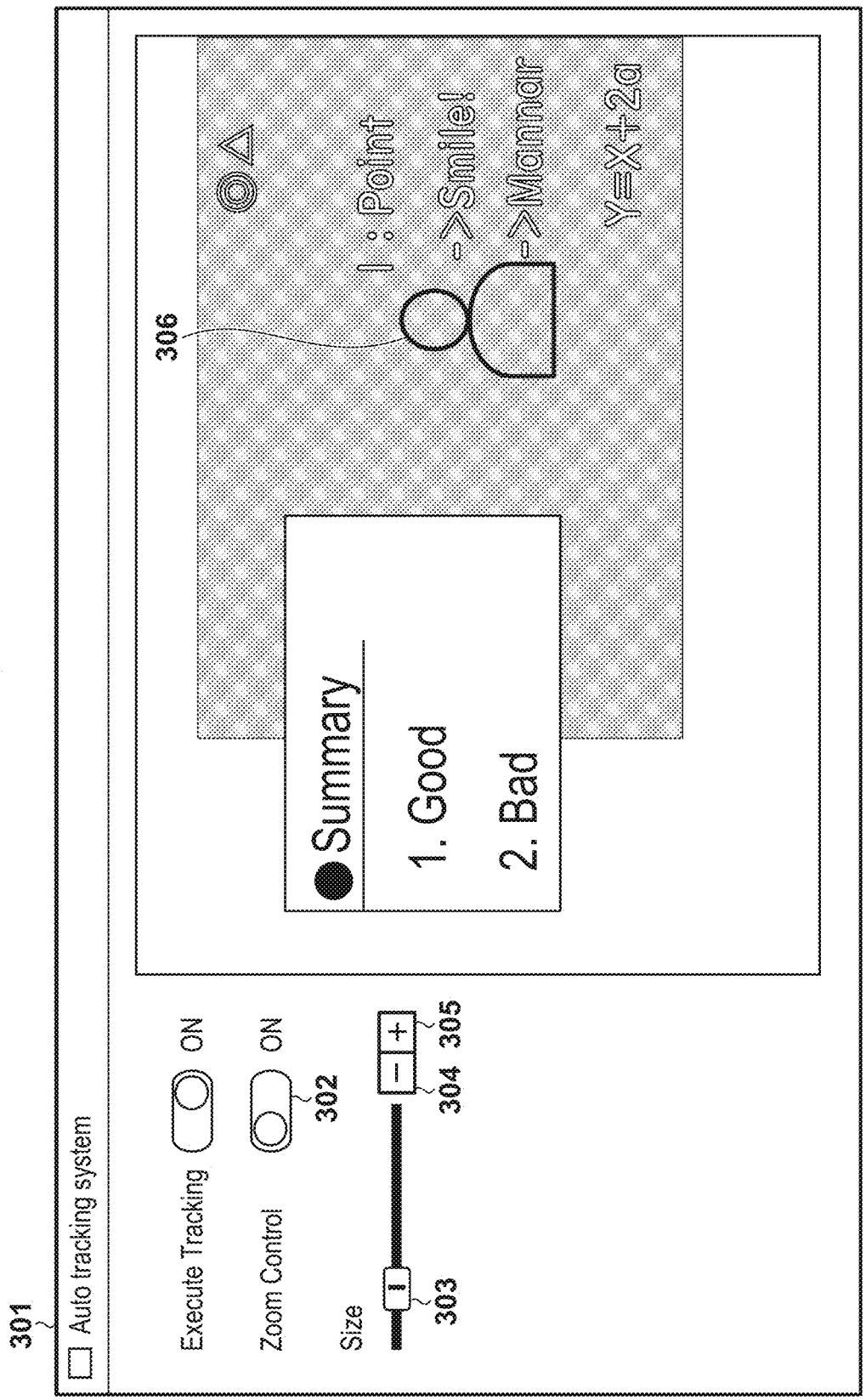
FIG. 3 is a view for explaining the configuration of a setting screen (when not performing zoom control)

FIG. 3 is a view for explaining the configuration of a GUI that sets the tracking function in the second mode. In the second mode, the position of the tracking target needs to be set.

A setting screen 301 is a screen of a web application having the same configuration as the setting screen 201. A toggle button 302 is a button configured to designate whether to perform zoom control during tracking. Here, to set the second mode tracking function, the toggle button 302 is set in an "OFF" state. That is, if the toggle button of the tracking function is set "ON", and the toggle button 302 is set "OFF", it is decided to accept the setting of the second mode tracking function. At this time, a slider bar 303, a button 304, and a button 305 are disabled, and the user cannot operate these.

An icon 306 is an icon that displays the target position of the tracking target. As the icon 306 (the second mode icon), an icon of a shape/color different from the icon 208 (the first mode icon) is used, and the user can easily discriminate it. In the example shown in FIG. 3, the icon 306 is shown as one having a shape different from the icon 208, but a discriminable form suffices. This allows the user to recognize that the size setting is disabled (the second mode is set).

Note that the icon 306 may be configured to be displayed in a predetermined size, or may be configured to be displayed in a size set when the toggle button 302 was in the "ON" state before. The user can change the setting of the position of the tracking target in the captured video by dragging and dropping the icon 306 in the video display region.

Figure 4:
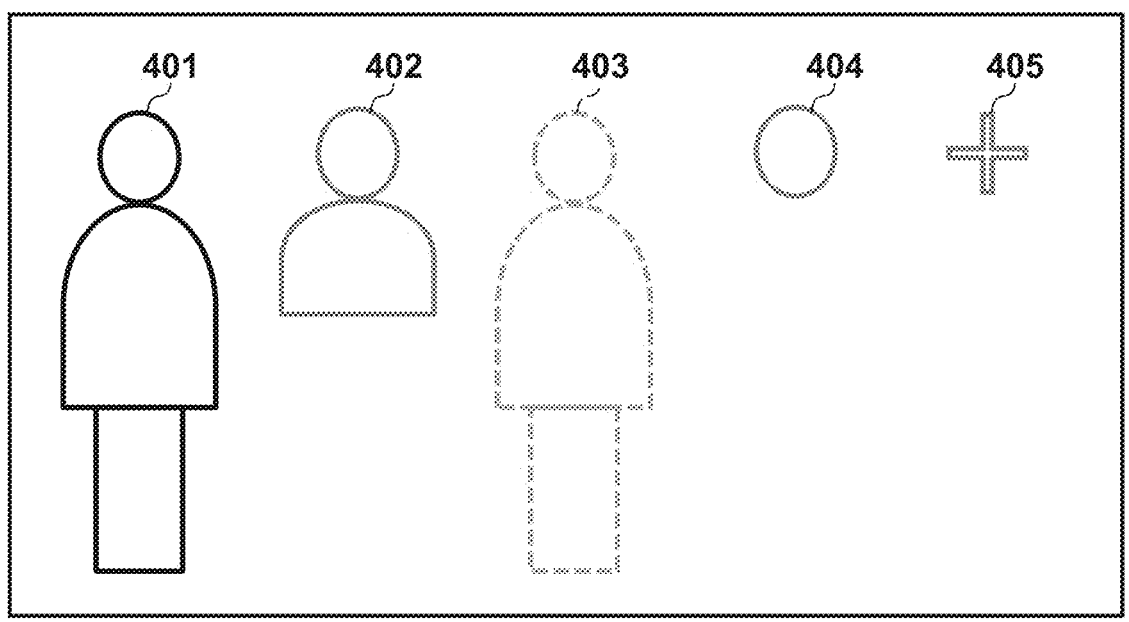
FIG. 4 is a view showing examples of icons indicating that zoom control is not performed.

FIG. 4 is a view showing examples of icons indicating that zoom control is not performed. More specifically, an icon 401 shows an example of an icon used when setting the tracking function in the first mode, and icons 402 to 405 show examples of icons used when setting the tracking function in the second mode.

The icon 401 is an icon (same as the icon 208) used when setting the tracking function in the first mode, and an icon representing "the whole image of an object (here, a full-length image of a person)" is used. If "the whole image of an object" is used as the icon, the user can intuitively understand that the icon indicates the target size in tracking.

On the other hand, the icon 402 is an icon (same as the icon 306) used when setting the tracking function in the second mode, and an icon representing "a partial image of an object (here, an image of only the upper half of a person)" is used. In addition, the color of the frame line of the icon 402 is changed lighter as compared to the icon 401. If "a partial image of an object" is used as the icon, the user can intuitively understand that the icon does not indicate the target size in tracking (indicates only the target position).

The icons 403 to 405 show examples of other icons used when setting the tracking function in the second mode. The icon 403 has the same shape as the icon 401 (the first mode icon). However, the frame is changed to a dotted line, thereby allowing the user to recognize that the mode is not the first mode. The icon 404 is "an image of a head only", and the icon 405 is "an image of a cross mark". This allows the user to more intuitively understand that the icon does not indicate the target size in tracking (indicates only the target position).

<Display of Setting Screen on Mobile Terminal>

As an example, a GUI in a case where the user interface unit 112 is a constituent element of a mobile terminal (for example, a smartphone) will be described in more detail. As characteristic features, in a mobile terminal, the display screen is relatively narrow, and the operation of the GUI is accepted by a touch operation. The following display processing can be implemented by, for example, a system control unit 1000 (for example, a CPU) of the information processing apparatus executing a corresponding program (stored in an HDD or the like).

Figure 5:
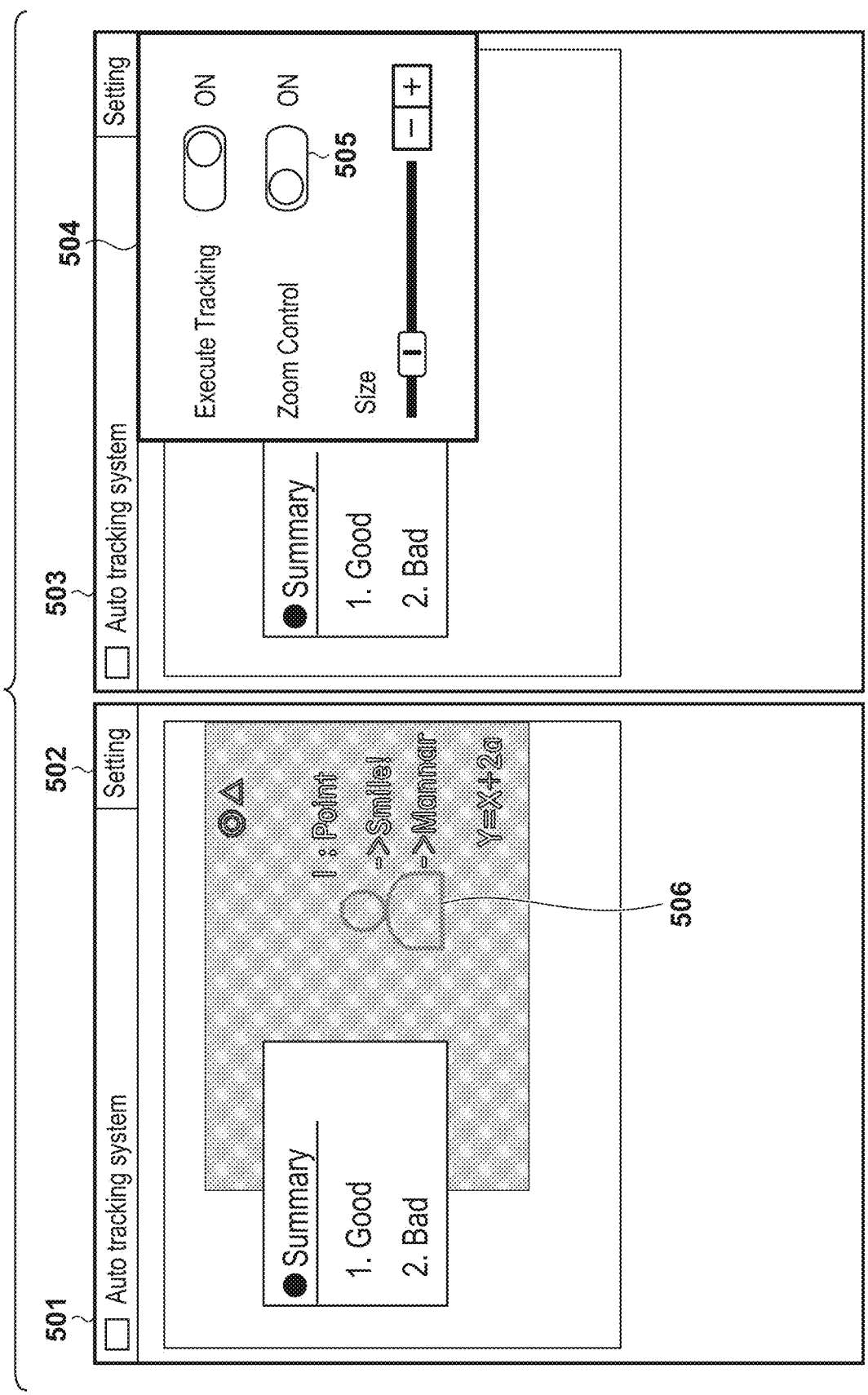
FIG. 5 is a view exemplarily showing display of the setting screen on a mobile terminal.

FIG. 5 is a view exemplarily showing display of the setting screen on a mobile terminal. More specifically, FIG. 5 shows a setting screen 501 displayed on the display screen of a mobile terminal when the mobile terminal executes a web application for performing tracking setting in the mobile terminal.

In the setting screen 501, since the display screen is relatively narrow, a screen configured to change a setting is not displayed in an initial state. In FIG. 5, in the setting screen 501, an icon 506 superimposed on a captured video obtained by the capturing apparatus is shown. Here, an example in which the icon 506 implicitly indicating that the second mode tracking function is set (the zoom operation is suppressed) is displayed is shown.

When a button 502 is pressed, a setting form screen 504 configured to do setting change is displayed. The setting form screen 504 is superimposed on a setting screen 503 (same as the setting screen 501), and GUI components corresponding to the toggle buttons and the slider bar on the left side of FIG. 2 are displayed.

A toggle button 505 is a button configured to designate whether to perform zoom control during tracking. Here, the toggle button 505 is in the OFF state because the second mode tracking function is set when the button 502 is pressed. For this reason, the user cannot perform an operation for changing the target size.

The icon 506 is an icon that displays the target position of the tracking target. Note that if the toggle button 505 is changed to "ON", an icon like the icon 401 is displayed. When the icon 401 is displayed, the user can intuitively understand that the icon indicates the target size in tracking.

<Operation of Capturing Apparatus>

Figure 6:
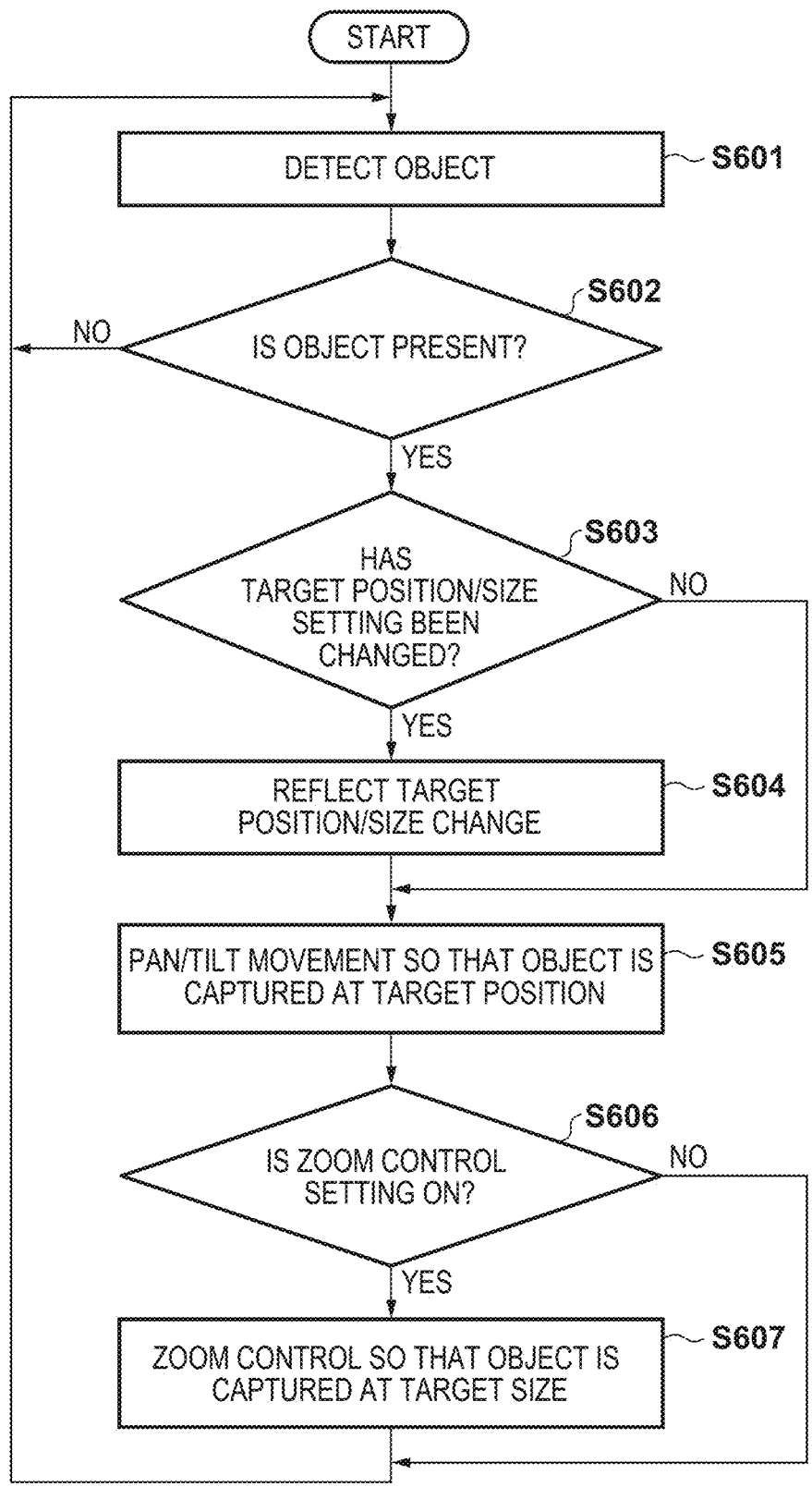
FIG. 6 is a flowchart for explaining an operation of tracking capturing.

FIG. 6 is a flowchart for explaining an operation of tracking capturing in the capturing apparatus for which the capturing apparatus tracking setting is done. Note that assume that none of pan/tilt/zoom of the capturing apparatus is being driven at the start of the flowchart of FIG. 6. The flowchart of FIG. 6 shows processing for one captured video (frame image), and the capturing apparatus repetitively executes the processing of the flowchart shown in FIG. 6 for a plurality of time-sequential captured videos. The processing corresponding to the flowchart can be implemented by, for example, the system control unit 103 of the capturing apparatus executing a corresponding program (stored in an HDD or the like).

In step S601, the image analysis unit 110 acquires a captured video of a latest frame and detects a human head portion in the video. For example, the captured video is input a learned model by deep learning, thereby detecting a human head portion. The method of detecting a head portion from a frame may be any method other than this, as a matter of course.

In step S602, the image analysis unit 110 determines whether an object of interest (an object that is a tracking target) is detected in step S601. If an object is detected, the process advances to step S603. If no object is detected, the process returns to step S601. Note that the image analysis unit 110 may set only an object included in a predetermined region to the tracking target. Alternatively, the image analysis unit 110 may obtain a specific person registered as a tracking target by matching from feature data of an image of a face portion and set it to the tracking target.

In step S603, the system control unit 103 confirms whether setting data associated with the tracking function is changed. Setting data associated with the tracking function is data associated with the above-described operation mode of the tracking function or the target position and/or the target size of the tracking target in the captured video. For example, upon receiving updated setting data via the communication interface unit 111, the system control unit 103 determines that the setting data is changed. If the setting data is changed, the process advances to step S604. If the setting data is not changed, the process advances to step S605.

In step S604, the system control unit 103 holds, in an internal memory, the setting of the operation mode or the target position and/or the target size designated by the updated setting data. Thus, in the subsequent pan/tilt/zoom control, an operation on which the contents of the updated setting data are reflected is performed.

In step S605, the system control unit 103 performs pan/tilt control such that the position of the tracking target in the captured video is the target position held in the internal memory. More specifically, based on the current pan angle and tilt angle and the position of the tracking target detected in step S601, the change amounts of the pan angle and the tilt angle, with which the position of the tracking target in the captured video is the target position, are derived. Then, the system control unit 103 instructs the derived change amounts of the pan angle and the tilt angle to the pan operation control unit 107 and the tilt operation control unit 109. Thus, the pan operation control unit 107 and the tilt operation control unit 109 control the pan operation driving unit 106 and the tilt operation driving unit 108 to perform pan/tilt control by the instructed change amounts.

In step S606, the system control unit 103 confirms whether a setting is done to perform zoom control during tracking. That is, it is confirmed whether the operation mode is the first mode (zoom control is ON), or the second mode (zoom control is OFF). If the zoom control is ON, the process advances to step S607. If the zoom control is OFF, the process returns to step S601.

In step S607, the system control unit 103 performs zoom control such that the size of the tracking target in the captured video is the target size held in the internal memory. More specifically, based on the current zoom magnification and the size of the tracking target detected in step S601, the change amount of the zoom magnification with which the size of the tracking target in the captured video is the target size is derived. Then, the system control unit 103 instructs the derived change amount of the zoom magnification to the lens control unit 105. Thus, the lens control unit 105 controls the lens driving unit 104 to perform zoom control by the instructed change amount.

<Functional Configuration of Information Processing Apparatus>

Figure 7:
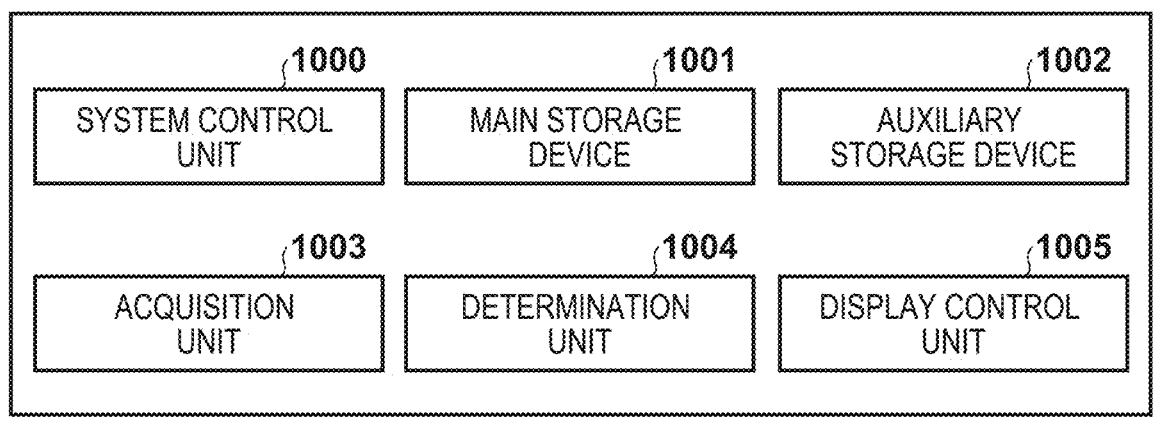
FIG. 7 is a view showing the functional blocks of an information processing apparatus.

FIG. 7 is a view showing the functional blocks of the information processing apparatus. The system control unit (CPU) 1000 executes processing using computer programs and data stored in a main storage device 1001, thereby performing operation control of the units of the information processing apparatus. In addition, the system control unit 1000 executes or controls each process to be described as processing to be performed by the information processing apparatus.

The main storage device 1001 is a storage device such as a Random Access Memory (RAM). The main storage device 1001 includes areas to store computer programs and data loaded from an auxiliary storage device 1002, and various kinds of data (for example, a captured video) received from the capturing apparatus. Also, the main storage device 1001 includes a work area used by the system control unit (CPU) 1000 when executing various kinds of processing. Thus, the main storage device 1001 can appropriately provide various kinds of areas.

The auxiliary storage device 1002 is an information storage device having a large capacity such as a hard disk drive (HDD), a Read Only Memory (ROM), or a solid state drive (SSD). The auxiliary storage device 1002 stores an operating system (OS), and computer programs and data configured to cause the system control unit (CPU) 1000 to execute or control each process to be described as processing to be performed by the information processing apparatus. The auxiliary storage device 1002 also stores various kinds of data (for example, a captured video) received from the capturing apparatus. The computer programs and data stored in the auxiliary storage device 1002 are appropriately loaded into the main storage device 1001 under the control of the system control unit (CPU) 1000, and processed by the system control unit (CPU) 1000.

An acquisition unit 1003 acquires, from the capturing apparatus, the captured video and the coordinate values of the target position of the tracking target on the captured video.

A determination unit 1004 performs various kinds of determination processing. The determination unit 1004 performs, for example, processing of determining whether the tracking function is in the first mode.

A display control unit 1005 displays the captured video on a display device. Also, the display control unit 1005 superimposes the first mode icon or the second mode icon on the captured video, and displays, on the display device, the captured video with the icon superimposed.

<Operation of Information Processing Apparatus>

Figure 8:
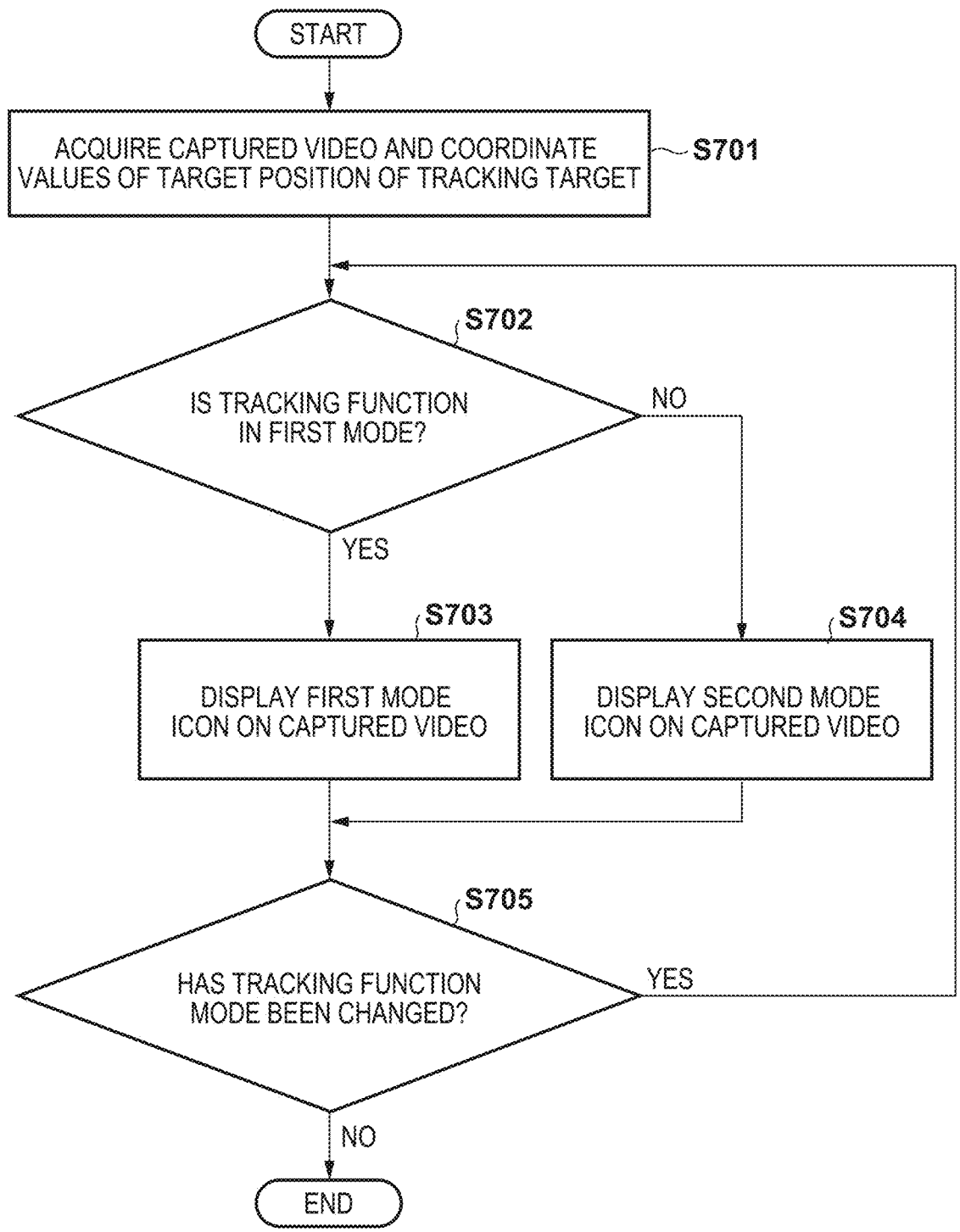
FIG. 8 is a flowchart for explaining display control of the information processing apparatus.

FIG. 8 is a flowchart for explaining display control of the information processing apparatus. Processing corresponding to the flowchart is started when the user does a tracking setting. The processing corresponding to the flowchart can be implemented by, for example, the system control unit 1000 (for example, a CPU) operating in the information processing apparatus executing the corresponding program (stored in an HDD or the like).

In step S701, the acquisition unit 1003 acquires, from the capturing apparatus, a captured video and the coordinate values of the target position of the tracking target on the captured video.

In step S702, the determination unit 1004 receives information concerning whether the tracking function is in the first mode, and determines whether the tracking function is in the first mode. If the tracking function is in the first mode, the process advances to step S703. If the tracking function is not in the first mode (here, if the tracking function is in the second mode), the process advances to step S704.

In step S703, the display control unit 1005 displays, on the display device, a video obtained by superimposing a first mode icon (for example, the icon 208 in FIG. 2) on the captured video. On the other hand, in step S704, the display control unit 1005 displays, on the display device, a video obtained by superimposing a second mode icon (for example, the icon 306 in FIG. 3) on the captured video.

In step S705, the determination unit 1004 determines whether the mode of the tracking function is changed. Upon determining that the mode of the tracking function is changed, the process returns to step S702. Upon not determining that the mode of the tracking function is changed, the processing of the flowchart is ended.

As described above, according to the first embodiment, in a GUI that sets a tracking function in a capturing apparatus configured to be able to perform PTZ control, an icon indicating a target position is changed depending on whether to perform zoom control. Thus, the user who sets the tracking function can intuitively understand the current setting of the tracking function (the setting concerning whether to perform zoom control).

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-182800, filed Nov. 15, 2022, and No. 2023-145579, filed Sep. 7 2023, which are hereby incorporated by reference herein in their entirety.

What is claimed is:

1. An information processing apparatus comprising:
one or more memories storing instructions; and
one or more processors executing the instructions to:
acquire a captured image obtained by a capturing apparatus having a tracking function for tracking an object; and
display, on a display device, a graphical user interface (GUI) configured to accept a setting of a target position in the captured image of an object that is a tracking target,
wherein, in the GUI, a display state of a first icon indicating the target position in the captured image in a case where a tracking mode is a first mode in which zoom control in tracking is permitted is different from a display state of a second icon indicating the target position in the captured image in a case where the tracking mode is a second mode in which the zoom control in tracking is not permitted.

2. The apparatus according to claim 1, wherein
the first icon is superimposed on the captured image obtained by the capturing apparatus in a case where the first mode is set, and
the second icon is superimposed on the captured image obtained by the capturing apparatus in a case where the second mode is set.

3. The apparatus according to claim 1, wherein
the GUI includes a first interface to accept a designation of whether to use the tracking function, and a second interface to accept a designation of whether to use the zoom control,
in a case where designation of using the tracking function and designation of using the zoom control are accepted, the first icon is displayed, and
in a case where the designation of using the tracking function and designation of not using the zoom control are accepted, the second icon is displayed.

4. The apparatus according to claim 1, wherein
in a case where the first icon is displayed, a target size in the captured image of the object that is the tracking target is configurable, and
in a case where the second icon is displayed, a target size in the captured image of the object that is the tracking target is not configurable.

5. The apparatus according to claim 4, wherein
the GUI further includes a third interface to accept a designation of a size of the first icon, and
the target size is changed in accordance with the size designated via the third interface.

6. The apparatus according to claim 5, wherein
in a case where the second icon is displayed, a size of the second icon cannot be changed.

7. The apparatus according to claim 1, wherein
the first icon is an icon representing a whole image of the object, and
the second icon is an icon that represents a partial image of the object and does not represent the whole image.

8. A control method of an information processing apparatus, the method comprising:

acquiring a captured image obtained by a capturing apparatus having a tracking function for tracking an object; and displaying, on a display device, a graphical user interface (GUI) configured to accept a setting of a target position in the captured image of an object that is a tracking target, wherein, in the GUI, a display state of a first icon indicating the target position in the captured image in a case where a tracking mode is a first mode in which zoom control in tracking is permitted is different from a display state of a second icon indicating the target position in the captured image in a case where the tracking mode is a second mode in which the zoom control in tracking is not permitted.

9. A non-transitory computer-readable recording medium storing a program for causing a computer to function as an information processing apparatus to:

acquire a captured image obtained by a capturing apparatus having a tracking function for tracking an object; and display, on a display device, a graphical user interface (GUI) configured to accept a setting of a target position in the captured image of an object that is a tracking target, wherein, in the GUI, a display state of a first icon indicating the target position in the captured image in a case where a tracking mode is a first mode in which zoom control in tracking is permitted is different from a display state of a second icon indicating the target position in the captured image in a case where the tracking mode is a second mode in which the zoom control in tracking is not permitted.

* * * * *